US012031511B2

(12) United States Patent
Wood, Sr. et al.

(10) Patent No.: US 12,031,511 B2
(45) Date of Patent: Jul. 9, 2024

(54) ON-BOARD STARTING MODULE FOR VEHICLE ENGINE

(71) Applicant: Systematic Power Manufacturing, LLC, Knoxville, TN (US)

(72) Inventors: Robert J. Wood, Sr., Oneonta, NY (US); Chad E. Hall, Oneonta, NY (US); Bryce Gregory, Port Crane, NY (US); Luke Yetto, Walton, NY (US); Daniel A. Patsos, Canajoharie, NY (US); Joseph Agrelo, Ballston Spa, NY (US)

(73) Assignee: Systematic Power Manufacturing, LLC, Knoxville, TN (US)

( * ) Notice: Subject to any disclaimer, the term of this patent is extended or adjusted under 35 U.S.C. 154(b) by 68 days.

(21) Appl. No.: 17/832,619

(22) Filed: Jun. 4, 2022

(65) Prior Publication Data

US 2022/0299002 A1 Sep. 22, 2022

Related U.S. Application Data

(63) Continuation-in-part of application No. 17/379,473, filed on Jul. 19, 2021, now Pat. No. 11,479,080, (Continued)

(51) Int. Cl.
*F02N 11/08* (2006.01)

(52) U.S. Cl.
CPC ........ *F02N 11/0866* (2013.01); *F02N 11/087* (2013.01); *F02N 2011/0885* (2013.01); (Continued)

(58) Field of Classification Search
CPC ............... F02N 11/0866; F02N 11/087; F02N 2011/0885; F02N 2011/0888; F02N 2200/061; F02N 2200/063
See application file for complete search history.

(56) References Cited

U.S. PATENT DOCUMENTS 5,710,699 A 1/1998 King et al.
6,476,586 B2 11/2002 Yunosawa et al.
(Continued)

FOREIGN PATENT DOCUMENTS

CN 205178537 U 4/2016
CN 106100091 A 11/2016

OTHER PUBLICATIONS

International Search Report and Written Opinion issued in PCT/US22/33062; issued Oct. 6, 2022; 13 pages.
(Continued)

*Primary Examiner* — Syed O Hasan
(74) *Attorney, Agent, or Firm* — Peter L. Brewer; Thrive IP

(57) ABSTRACT

A starting module for a vehicle is provided. The starting module is configured to reside on-board the vehicle, and is used to start an engine associated with the vehicle in the event the battery on the vehicle is too weak to crank the engine. The engine starting module first comprises a housing. The housing resides proximate the vehicle battery and holds a plurality of super capacitors. The super capacitors reside within the housing, in series, and are electrically in parallel with the vehicle battery. The super capacitors store charge received from the electrical system of the vehicle. The starting module also includes control logic. The control logic controls the release of energy from the super capacitors. The engine starting module also comprises an isolation switch, which is configured to move between open and close positions in response to signals from the control logic.

25 Claims, 10 Drawing Sheets

Related U.S. Application Data which is a continuation-in-part of application No. 16/352,555, filed on Mar. 13, 2019, now Pat. No. 11,069,488.

(60) Provisional application No. 63/300,687, filed on Jan. 19, 2022, provisional application No. 63/209,848, filed on Jun. 11, 2021, provisional application No. 63/209,879, filed on Jun. 11, 2021, provisional application No. 63/209,887, filed on Jun. 11, 2021.

(52) U.S. Cl.
CPC . *F02N 2011/0888* (2013.01); *F02N 2200/061* (2013.01); *F02N 2200/063* (2013.01)

(56) References Cited

U.S. PATENT DOCUMENTS

| | | | |
|---|---|---|---|
| 6,518,733 | B1 | 2/2003 | Schenkel et al. |
| 6,765,312 | B1 | 7/2004 | Urlass et al. |
| 6,799,070 | B2 | 9/2004 | Wolfe et al. |
| 7,077,209 | B2 | 7/2006 | McCulloch et al. |
| 7,119,518 | B1 | 10/2006 | Dougherty et al. |
| 7,193,390 | B2 | 3/2007 | Nagai et al. |
| 7,362,005 | B2 | 4/2008 | Leblanc |
| 7,548,409 | B2 | 6/2009 | Kojima et al. |
| 7,628,028 | B2 | 12/2009 | Tolbert, Jr. et al. |
| 7,633,271 | B2 | 12/2009 | Schulte et al. |
| 7,667,432 | B2 | 2/2010 | West et al. |
| 7,782,016 | B2 | 8/2010 | Kang et al. |
| 7,887,943 | B2 | 2/2011 | Yoshikane et al. |
| 7,944,080 | B2 | 5/2011 | Ishizeki |
| 7,946,123 | B2 | 5/2011 | Tolbert, Jr. et al. |
| 8,264,333 | B2 | 9/2012 | Blaker et al. |
| 8,305,733 | B2 | 11/2012 | Chan et al. |
| 8,314,578 | B2 | 11/2012 | Namuduri et al. |
| 8,379,367 | B2 | 2/2013 | Oh et al. |
| 8,519,821 | B2 | 8/2013 | Ablabutyan |
| 8,655,574 | B2 | 2/2014 | Izumoto et al. |
| 8,751,116 | B2 | 6/2014 | Bark et al. |
| 8,792,224 | B2 | 7/2014 | Kim et al. |
| 8,798,871 | B2 | 8/2014 | Lugash et al. |
| 8,860,244 | B2 | 10/2014 | Hattori |
| 8,886,425 | B2 | 11/2014 | Doering et al. |
| 9,272,627 | B2 | 3/2016 | Miller |
| 9,300,018 | B2 | 3/2016 | Watson et al. |
| 9,415,690 | B2 | 8/2016 | Ferrer-Dalmau Nieto et al. |
| 9,562,715 | B2 | 2/2017 | Kandasamy |
| 9,616,796 | B2 | 4/2017 | Russo |
| 9,627,908 | B2 | 4/2017 | Kaminsky et al. |
| 9,666,860 | B2 | 5/2017 | Lam et al. |
| D792,847 | S | 7/2017 | Stone et al. |
| 9,803,609 | B2 | 10/2017 | Setterberg et al. |
| 9,833,223 | B2 | 12/2017 | Wood et al. |
| 9,892,868 | B2 | 2/2018 | Pyzza et al. |
| 9,899,643 | B2 | 2/2018 | Pyzza et al. |
| 9,911,541 | B2 | 3/2018 | Wang et al. |
| 9,991,060 | B2 | 6/2018 | Bouchard et al. |
| 10,000,125 | B2 | 6/2018 | Choi |
| 10,023,065 | B2 | 7/2018 | Huang et al. |
| 10,024,408 | B2 | 7/2018 | Johnson |
| 10,029,572 | B2 | 7/2018 | Sakatani et al. |
| 10,065,523 | B2 | 9/2018 | Wood et al. |
| 10,119,514 | B2 | 11/2018 | Averbukh et al. |
| 10,153,096 | B2 | 12/2018 | Xi et al. |
| 10,158,152 | B2 | 12/2018 | Watson et al. |
| D840,340 | S | 2/2019 | Suszko et al. |
| 10,240,847 | B1 | 3/2019 | Thomas, Jr. |
| 10,242,808 | B2 | 3/2019 | Eilertsen et al. |
| 10,278,681 | B2 | 5/2019 | Wood et al. |
| 10,297,572 | B2 | 5/2019 | Dalal et al. |
| 10,297,885 | B2 | 5/2019 | Gayden et al. |
| 10,319,536 | B1 | 6/2019 | Achrekar |
| 10,523,019 | B2 | 12/2019 | Rohera |
| 10,551,104 | B2 | 2/2020 | Kandasamy |
| 10,596,913 | B2 | 3/2020 | Healy et al. |
| 10,654,369 | B2 | 5/2020 | Healy |
| 10,668,825 | B2 | 6/2020 | Wood et al. |
| 10,668,831 | B2 | 6/2020 | Hudson |
| 10,710,525 | B2 | 7/2020 | Pierce et al. |
| 10,723,182 | B2 | 7/2020 | Lesesky et al. |
| 10,744,888 | B2 | 8/2020 | Healy et al. |
| 10,821,853 | B2 | 11/2020 | Healy et al. |
| 10,967,742 | B2 | 4/2021 | Healy |
| 10,981,487 | B1 | 4/2021 | Russo |
| 11,046,192 | B2 | 6/2021 | Aufdencamp |
| 11,069,488 | B2 | 7/2021 | Johnson |
| 11,165,266 | B2 | 11/2021 | Johnson et al. |
| 11,273,716 | B2 | 3/2022 | Matsuda et al. |
| 11,281,982 | B2 | 3/2022 | Cristache |
| 11,293,394 | B2 | 4/2022 | Banerjee et al. |
| 11,303,139 | B2 | 4/2022 | Hinterberger et al. |
| 11,303,980 | B2 | 4/2022 | Chng et al. |
| 2003/0151875 | A1 | 8/2003 | Nguyen et al. |
| 2006/0005739 | A1 | 1/2006 | Kumar |
| 2007/0047100 | A1 | 3/2007 | Takahashi et al. |
| 2007/0132313 | A1 | 6/2007 | Baeuerle |
| 2008/0268330 | A1 | 10/2008 | Hansen et al. |
| 2009/0091291 | A1 | 4/2009 | Woody et al. |
| 2009/0133419 | A1 | 5/2009 | Matsuno et al. |
| 2009/0266091 | A1 | 10/2009 | Tolbert, Jr. |
| 2009/0314561 | A1 | 12/2009 | Handa |
| 2010/0079109 | A1 | 4/2010 | Eilertsen et al. |
| 2010/0148582 | A1 | 6/2010 | Carter |
| 2010/0275628 | A1 | 11/2010 | Moseley |
| 2011/0030414 | A1 | 2/2011 | Newell et al. |
| 2011/0218698 | A1 | 9/2011 | Bissontz |
| 2011/0288738 | A1 | 11/2011 | Donnelly et al. |
| 2012/0049638 | A1 | 3/2012 | Dorn et al. |
| 2012/0235473 | A1 | 9/2012 | Jiang et al. |
| 2012/0237799 | A1 | 9/2012 | Jiang et al. |
| 2012/0301750 | A1 | 11/2012 | Reis et al. |
| 2013/0031318 | A1 | 1/2013 | Chen et al. |
| 2013/0248165 | A1 | 9/2013 | Kandasamy |
| 2013/0248615 | A1 | 9/2013 | Yeates |
| 2013/0264875 | A1 | 10/2013 | Kaminsky et al. |
| 2013/0266824 | A1 | 10/2013 | Cowperthwaite et al. |
| 2013/0266826 | A1 | 10/2013 | Cowperthwaite et al. |
| 2014/0041179 | A1 | 2/2014 | Bradley et al. |
| 2014/0136055 | A1 | 5/2014 | Sugiyama et al. |
| 2015/0240939 | A1 | 8/2015 | Ge |
| 2015/0246593 | A1 | 9/2015 | Larson et al. |
| 2015/0300307 | A1* | 10/2015 | Setterberg ............. H02J 7/1423 701/113 |
| 2016/0176298 | A1 | 6/2016 | Watson et al. |
| 2016/0243960 | A1 | 8/2016 | Wood et al. |
| 2016/0327007 | A1 | 11/2016 | Averbukh et al. |
| 2017/0063104 | A1 | 3/2017 | Bean |
| 2017/0194903 | A1 | 7/2017 | Herbert |
| 2018/0013112 | A1 | 1/2018 | Cameron |
| 2018/0198290 | A1* | 7/2018 | Rohera ................. H02J 7/0014 |
| 2018/0249517 | A1 | 8/2018 | Park et al. |
| 2019/0013692 | A1 | 1/2019 | Dellevergini |
| 2019/0061555 | A1 | 2/2019 | Liu et al. |
| 2019/0067754 | A1 | 2/2019 | Gu et al. |
| 2019/0176650 | A1* | 6/2019 | Wood ...................... B60L 50/40 |
| 2020/0052517 | A1* | 2/2020 | Rosso ..................... H02J 7/345 |
| 2020/0127479 | A1 | 4/2020 | Johnson et al. |
| 2021/0012975 | A1 | 1/2021 | Su et al. |
| 2021/0151809 | A1 | 5/2021 | Kong et al. |

OTHER PUBLICATIONS

Translation of CN 205178537 U; Published Apr. 20, 2016; 7 pages.
Translation of CN 106100091 A; Published Nov. 9, 2016; 4 pages.

* cited by examiner

ON-BOARD STARTING MODULE FOR VEHICLE ENGINE

STATEMENT OF RELATED APPLICATIONS

This application claims the benefit of U.S. Ser. No. 63/209,887 filed Jun. 11, 2021. That application is entitled "On-Board Engine Starting Module."

This application also claims the benefit of U.S. Ser. No. 63/300,687 filed Jan. 19, 2022. That application is also entitled "On-Board Engine Starting Module."

This application is also filed as a Continuation-in-Part of U.S. Ser. No. 17/379,473 filed Jul. 19, 2021. That application is entitled "Hybrid Energy Power Module for Mobile Electrical Devices."

The '473 application was filed as a Continuation-in-Part of U.S. Ser. No. 16/352,555 filed Mar. 13, 2019. That application is entitled "Hybrid Super-Capacitor and Battery."

Each of these applications is incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce selected aspects of the art, which may be associated with various embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Field of the Invention

The present disclosure relates to the field of power generation for vehicles. More specifically, the present invention relates to an on-board starting module that may be activated to start a combustible engine when the battery in the vehicle is weak or has otherwise lost cranking power.

Discussion of Technology

Cars and trucks of various sizes sometimes suffer from the inability to start reliably. This may be because the starter has broken or the alternator has gone out. More commonly, it is because the battery has become too weak to generate the charge necessary to start the engine.

All vehicles that are powered by an internal combustion engine rely on some version of a lead acid battery. Such batteries utilize two electrical terminals, referred to as "electrodes." The electrodes are separated by a chemical substance called an electrolyte. Electrical energy is released in response to a chemical reaction involving the electrodes and the electrolyte. Once the chemicals have been depleted, the reactions stop and the battery is no longer able to provide a charge to start the engine.

Depending on size, batteries can hold large amounts of power. At the same time, lead acid batteries lose charge over time as the chemical reaction dissipates. This is particularly true when the battery is exposed to cold temperatures or sits idle for an extended period of time. In addition, lead acid batteries have a limited number of crank cycles, sometimes less than 1,000 cycles. This is a particular problem for delivery vehicles that make multiple curbside stops.

The operators of delivery vehicles prefer to allow their engines to idle. This saves battery life and expedites deliveries. However, some county and local regulations prevent idle times for delivery trucks in order to reduce carbon emissions. Indeed, many countries in Europe have regulations against engine idling for most all vehicles. In the case of delivery drivers, this makes it necessary for drivers to frequently re-start engine vehicles during curbside stops. Of interest, this cycle of starting and stopping forces the battery to expend energy on lights, air fans, and other electrical components while the truck is stopped, further draining the battery. Compounding the problem, the drive time between deliveries is short so the battery may never get fully recharged by the alternator between stops.

For the reasons outlined above, all service trucks as well as tractor trailers suffer from the occasional inability to start reliably due to stress on the battery. This requires the vehicle to be towed, or for a maintenance vehicle to be called out in an attempt to re-charge the battery on location.

Therefore, a need exists for a power module that resides on-board a delivery vehicle and that serves the function of a generator. A need further exists for such a power module that incorporates a bank of super capacitors to assist the battery in starting the engine. Further, a need exists for an on-board engine starting module that can crank the engine even when the battery is completely dead, and then be re-charged by the battery and alternator once a voltage level on the vehicle battery has been restored.

SUMMARY OF THE INVENTION

An engine starting module for a vehicle is provided herein. The vehicle may be a delivery vehicle such as a so-called city delivery truck. Alternatively, and by way of example, the vehicle may be a class-07 or class-08 over-the-road truck. Alternatively, the vehicle may be a large recreational boat such as a yacht or a so-called cabin cruiser. Alternatively still, the vehicle may be a commercial boat such as a ferry or fishing vessel.

The engine starting module resides on-board the vehicle, or at least is configured to reside on-board the vehicle. The starting module provides energy for starting an engine associated with the vehicle in the event the battery on the vehicle is too weak to crank the engine. In the case of a large boat, the starting module may be called upon to start multiple outboard motors or a large on-board engine.

In one aspect, the engine starting module first comprises a housing. The housing is configured to reside on-board the vehicle, preferably proximate the vehicle battery. The housing enables the engine starting module to be moved onto the vehicle as an after-market product.

The starting module also includes a plurality of super capacitors. The plurality of super capacitors reside within the housing. The super capacitors are connected in series within the housing, and are configured to store charge received from an electrical system of the vehicle. In one aspect, the plurality of super capacitors comprises six to 12 super capacitors, inclusive. Preferably, the plurality of super capacitors defines six super capacitors, with each super capacitor having a value of 6,000 Farads and an output of 2.4 volts DC.

The plurality of super capacitors are electrically in parallel with the vehicle battery.

In one aspect, the engine starting module further comprises a direct current (DC) converter. The DC converter also resides within the housing. The DC converter is in electrical communication with the battery of the vehicle, and is configured to transform voltage from the vehicle's electrical system in order to charge (or re-charge) the plurality of super capacitors.

The engine starting module also includes control logic. The control logic controls the release of energy from the super capacitors to the battery. The control logic also controls the re-charging of the super capacitors once the vehicle engine is started and the alternator is turning (or "spinning").

The starting module also comprises an isolation switch. The isolation switch resides between the control logic and the plurality of super capacitors. In one embodiment, the isolation switch separates a ground of the battery from a ground of the super capacitors. The isolation switch is configured to move between open and close positions in response to signals from the control logic. In its default state, the isolation switch is open and separates the charge of the super capacitors from the vehicle battery. When closed, the isolation switch enables the super capacitors to send current to the vehicle battery.

In operation, when a condition of non-start is detected in the vehicle, the control logic closes the isolation switch and releases energy stored in the super capacitors into the vehicle battery. This is done for a designated time, which is a period of time sufficient to allow electronics in the vehicle to reset and to allow the vehicle battery to start the engine. In one aspect, the designated time is at least 10 seconds. Current is provided to the battery to raise the voltage to an operating threshold.

In one embodiment, the engine starting module includes at least one voltage comparator. The voltage comparator is part of the control logic, and is configured to detect a voltage of the electrical system of the vehicle. The electrical system includes the battery, the alternator and the DC bus of the vehicle. In the parlance of the industry, the DC bus and the battery are sometimes referred to together as the vehicle bus or the battery bus.

If the voltage of the vehicle battery is below a re-charge voltage threshold as detected by the voltage comparator, the control logic will send a signal that closes the isolation switch to re-charge the vehicle battery (or battery bus). The isolation switch may be re-opened after the designated period of time. Alternatively, the isolation switch may be re-opened after the voltage level of the vehicle battery has reached its designated voltage level, or operating threshold.

In one aspect, closing the switch also starts an alternator associated with the vehicle. This may further charge the battery. Thereafter, the plurality of super capacitors are re-charged by the vehicle's electrical system. Preferably, the control logic causes the super capacitors to be constantly charged by the alternator and/or the vehicle battery at 14.5 volts for as long as the battery voltage is at least 9 volts, or is at or above the operating threshold, or whatever voltage that threshold is.

A method of starting an engine is also provided herein. In one aspect, the method first comprises providing a vehicle. The vehicle has one or more batteries, and a combustible engine. The vehicle may be a delivery vehicle such as a so-called city delivery truck, or an over-the-road truck. Alternatively, the vehicle may be a boat such as a pleasure boat or a commercial boat. The battery is typically a lead acid battery used to supply power to crank the engine.

The method also includes providing a bank of super capacitors. The super capacitors reside on-board the vehicle, and within a housing. The housing is ideally designed as an after-market product that allows a vehicle operator to purchase the housing and then install it on the vehicle in such a manner that the electronics within the housing are in parallel with the vehicle battery.

The bank of super capacitors is in selective electrical communication with the battery by means of an isolation switch. The super capacitors may be in accordance with the super capacitors described above, in their various embodiments. As described above, a flow of current between the super capacitors and the battery is controlled, or modulated, by a control circuit.

The method also comprises operating the vehicle for a period of time. This means that the engine is turned on in connection with, or between, deliveries. There may be extended periods of non-start, or storage, between deliveries. Upon detecting that the vehicle is in a condition of non-start, the method includes closing the isolation switch. Non-start means that the battery does not have enough voltage to provide charge to the starter of the vehicle. Detection of this condition and closing of the isolation switch serves to release energy from the super capacitors to the battery. In this way, the battery is charged (or re-charged).

The method additionally includes starting the engine on the vehicle. It is noted that starting the engine will turn, or spin, the alternator. The housing and its bank of super capacitors, in essence, serve as an on-board generator for starting the engine and turning the alternator.

In one aspect, the method further comprises providing control logic for the bank of super capacitors. The control logic resides as part of the control circuit and controls a flow of current between the bank of super capacitors and the vehicle battery. The method then also includes monitoring a voltage of the battery.

In one embodiment, during a designated time, the control logic is configured to modulate discharge of the plurality of ultra-capacitors based on a comparison of the voltage level of the vehicle battery to a predetermined voltage threshold so as to raise the voltage level to at least the predetermined voltage threshold, or "operating threshold." If the operating threshold is reached during the designated time, the control logic is configured to open the isolation switch by sending an open signal. The operating voltage threshold may be, for example, 9 volts.

Optionally, the isolation switch is opened after the battery has reached its operating threshold and after the super capacitors have been re-charged. In one aspect, the control logic causes the super capacitors to be constantly charged by the alternator and/or the vehicle battery at 14.5 volts for as long as the battery voltage is at least 9 volts. In this instance, the isolation switch remains closed.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Figure 1A:
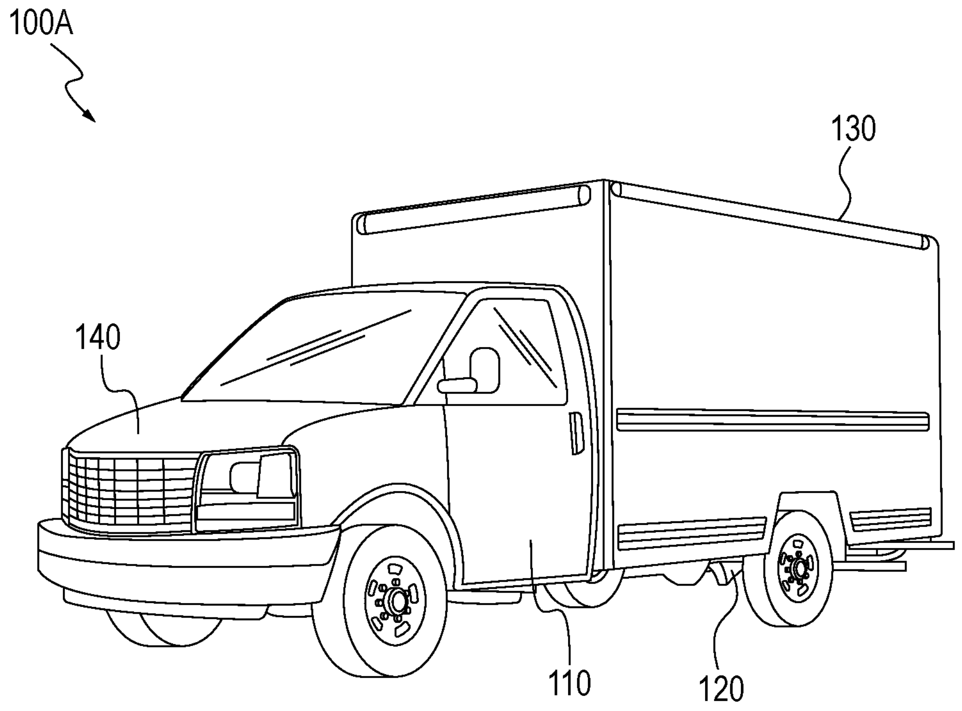
FIG. 1A (Prior Art)
FIG. 1A is a perspective view of a city delivery truck, in one embodiment. This particular truck is a so-called city delivery truck.

FIG. 1A is a perspective view of a city delivery truck 100A. This particular truck 100A medium duty, multi-stop delivery truck. Such trucks are commonly used for local deliveries and can be driven without a commercial driver's license in most states.

Figure 1B:
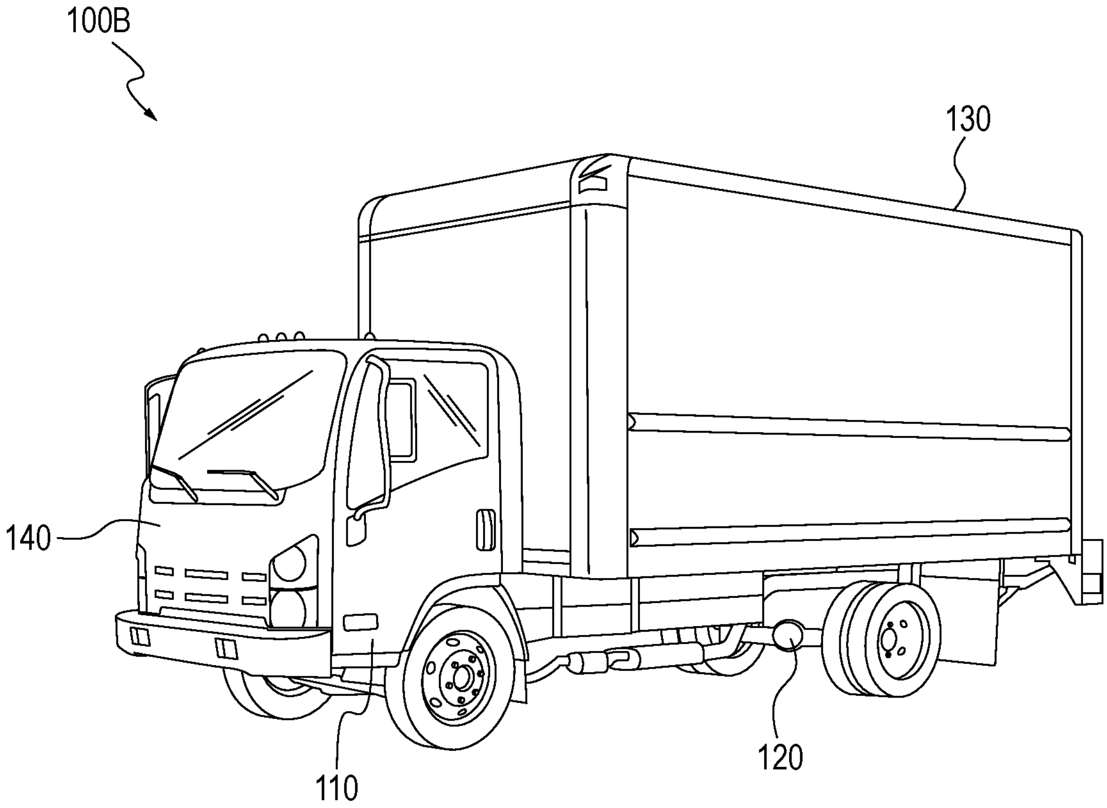
FIG. 1B (Prior Art)
FIG. 1B is another perspective view of a city delivery truck. This particular truck is a so-called light duty box truck.
Figure 1C:
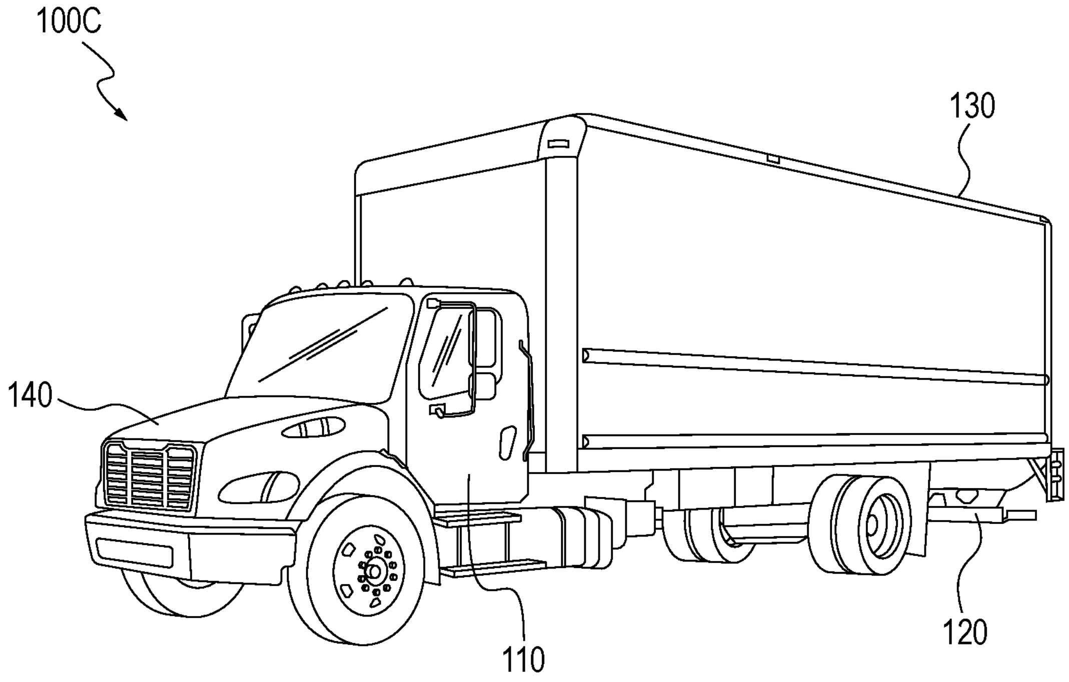
FIG. 1C (Prior Art)
FIG. 1C is another perspective view of a city delivery truck. This particular truck is a medium duty truck.

FIG. 1B is another perspective view of a city delivery truck 100B. This particular truck 100B is a so-called light duty box truck. Alternatively, this truck may be referred to as a "hi-cube" truck. Such trucks are also frequently used for local deliveries FIG. 1C is another perspective view of a city delivery truck 100C. This particular truck 100C is a medium duty truck. Such trucks come in both CDL and non-CDL configurations and are used for the delivery of heavier items such as refrigerators and mechanical equipment.

Figure 1D:
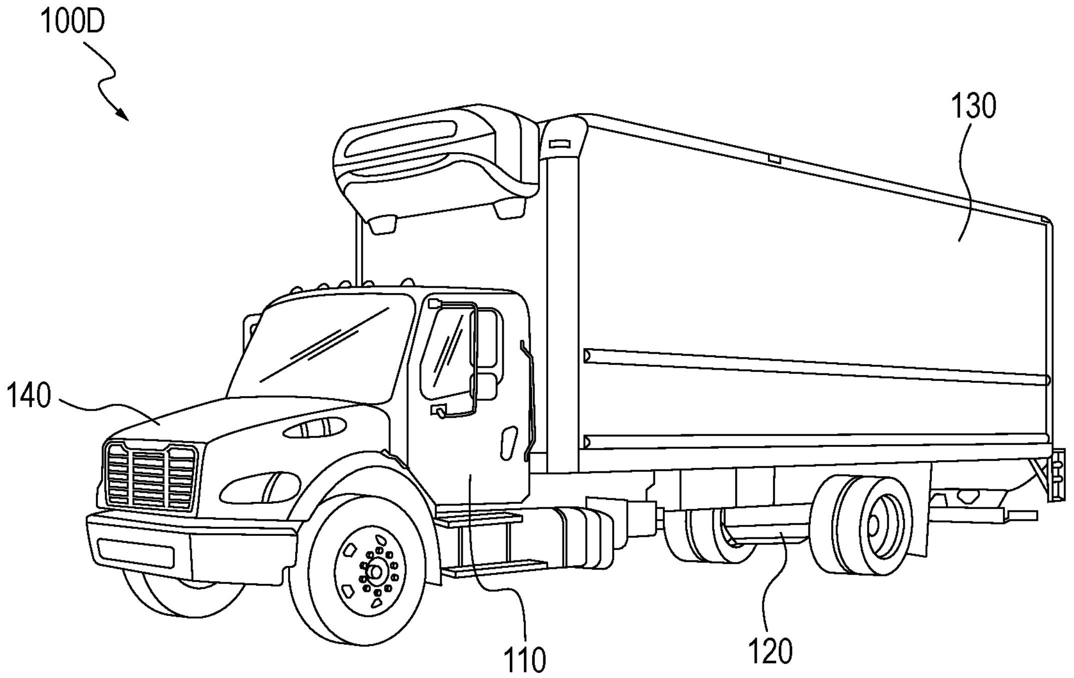
FIG. 1D (Prior Art)
FIG. 1D is another perspective view of a city delivery truck. This particular truck is a refrigerated truck.

FIG. 1D is another perspective view of a city delivery truck 100D. This particular truck is a refrigerated truck.

Figure 1E:
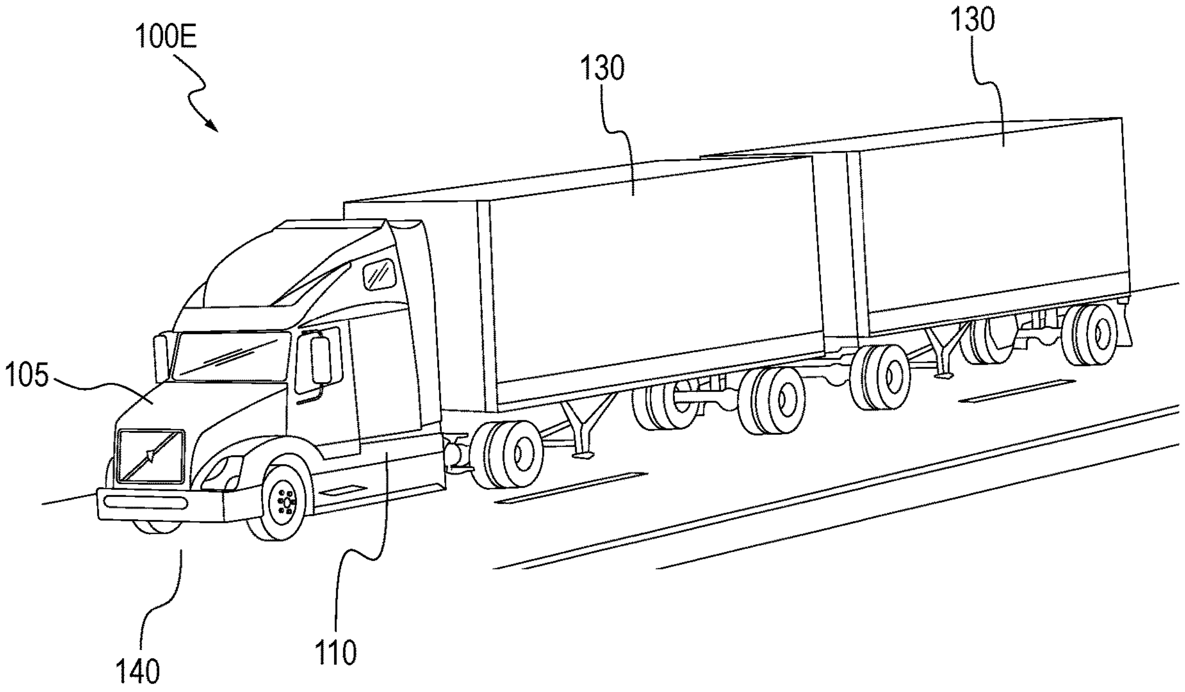
FIG. 1E (Prior Art)
FIG. 1E is a perspective view of an over-the-road delivery truck. The tractor of the truck is pulling two trailers in series.

FIG. 1E is a perspective view of an over-the-road delivery truck 100E. Here, a so-called tractor 105 is used to pull a separate trailer 130. In this instance, the tractor 105 is actually pulling two trailers 130, in series.

Each of trucks 100A, 100B, 100C, 100D and 100E is known and ubiquitously used in the transportation and shipping industries. Such trucks are available from Penske System, Inc. of Bloomfield Hills, Michigan and others. Each truck 100A, 100B, 100C, 100D includes a cab 110, a chassis 120 and a cargo compartment 130. In the case of trucks 100A, 100B, 100C and 100D, the cargo compartment 130 is mounted on the same chassis 120 as the cab 110. In the case of truck 100D, the cargo compartment 130 includes a refrigeration system. In the case of truck 100E, the cargo compartments 130 are part of trailers.

In each truck 100A, 100B, 100C, 100D, 100E, the cargo compartment 130 is enclosed although it is known to have open, flatbed trucks. Each truck 100A, 100B, 100C, 100D, 100E, also includes an engine compartment 140. The engine compartment holds the engine, an engine cooling system and a power system (not shown) for the vehicle. The power system will include at least one battery, an alternator, and a DC bus.

Figure 2:
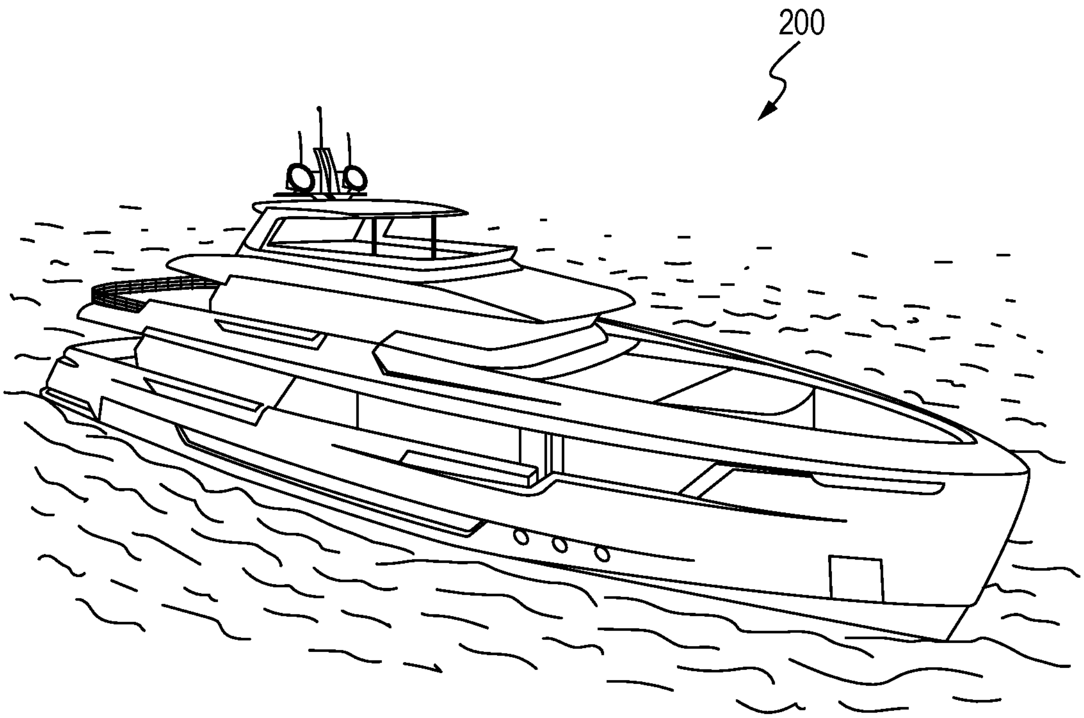
FIG. 2 (Prior Art)
FIG. 2 is a perspective view of a yacht, which is an example of a vessel. The yacht has a large on-board motor for powering the vessel during transport.

FIG. 2 is a perspective view of a vessel 200. The illustrative vessel 200 may be representative of any pleasure vessel such as a cabin cruiser or large fishing boat. However, the specific vessel 200 shown in FIG. 2 is a yacht.

The yacht 200 will have a collection of batteries (not shown) that run the electrical systems on the vessel 200. In addition, the yacht 200 will have a large on-board motor for powering the vessel during transport. Ironically, many yachts, even smaller ones (which are still in excess of 60 feet in length), now come equipped with rear tender garages that hold one or two large jet skis. These jet skis will have their own engines that are used for power, and will have their own batteries that provide start power for a starter switch.

The vessel 200 of FIG. 2, is illustrative. Other vessels such as commercial fishing boats and ferries also use batteries.

The batteries associated with all of the vehicles 100A, 100B, 100C, 100D, 100E and 200 are susceptible to draining below an operational voltage level. Below this level, the battery cannot crank the engine (or, in the case of a vessel having multiple outboard motors, the engines).

Figure 3:
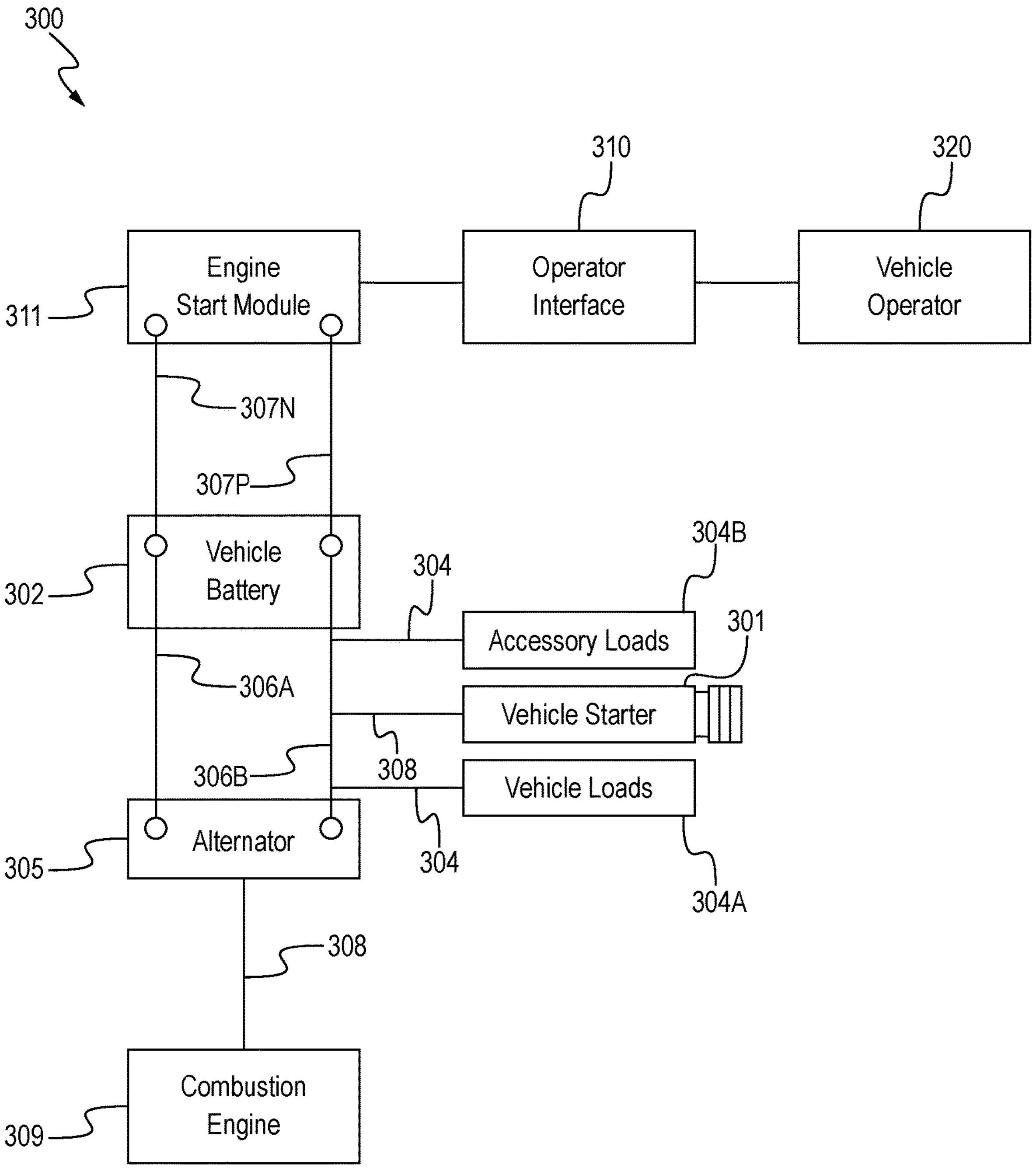
FIG. 3 is a diagram illustrating an electrical system for a vehicle. The vehicle has an internal combustion engine, along with a vehicle battery and an alternator. An on-board engine starting module is shown schematically, connected to the vehicle battery.

FIG. 3 is a diagram illustrating an electrical system for a vehicle 300. The vehicle 300 may be, for example, a car or a truck. The vehicle 300 may be a commercial vehicle such as a class-07 or class-08 semi-cab, or may be representative of a vessel such as a commercial boat or a pleasure boat. In any instance, the vehicle 300 includes a vehicle battery 302 and a vehicle alternator 305.

The battery 302 is a traditional lead acid battery. The battery 302 is in electrical communication with the alternator 305 by means of conductive cables 306. The cables may be a negative DC bus 306*a* and a positive DC bus 306*b*.

Cables 304 extend from the vehicle battery 302 as part of the DC bus, or wiring harness. The cables 304 send electrical energy to support vehicle loads 304*a* and accessory loads 304*b*. The term "vehicle loads" 304*a* generally refers to the hotel load internal to the vehicle while "accessory loads" 304*b* generally refers to external loads that may be carried by the vehicle, such as lighting for the trailer or aftermarket parts.

The vehicle battery 302 sends a charge to a vehicle starter 301 in order to crank a combustion engine 309. Line 308 is illustrative of a DC bus used to convey charge from the starter 301. Thereafter, energy from the battery 302 and the alternator 305 support the vehicle loads 304*a* and accessory loads 304*b*.

In the illustrative arrangement of FIG. 3, the vehicle battery 302 is in electrical communication with an engine starting module 311. This is done using positive 307P and negative 307N cables. Preferably, the engine starting module 311 resides on the vehicle 300 in proximity to the vehicle battery 302. In this way the cables 307 are short, e.g., less than 5 feet, in order to reduce so-called resistive line loss.

Figure 4:
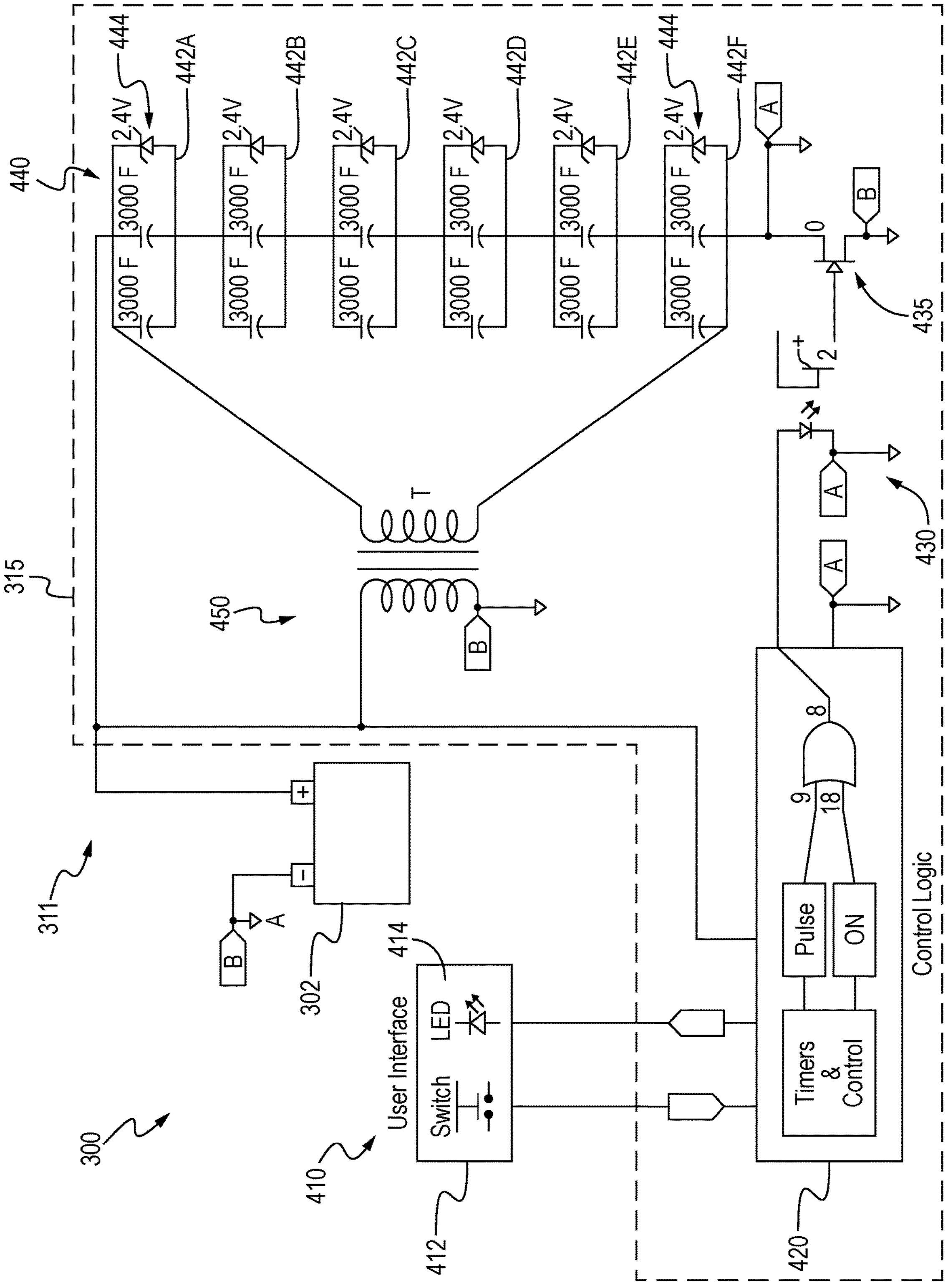
FIG. 4 is a circuit diagram showing the architecture of the engine starting module of FIG. 3, in one embodiment.

The engine starting module 311 preferably resides within a housing (represented by box 315 in FIG. 4). The engine starting module 311 provides energy for starting the vehicle engine 309 in the event the battery 302 on the vehicle (such as any tractor, city delivery truck, or boat) is too weak to crank the engine 309. In this instance, the battery 302 voltage has fallen below an operating voltage threshold.

FIG. 4 is a diagram illustrating architecture for the vehicle 300 and the engine starting module 311. The vehicle battery 302 is shown in FIG. 4. The alternator 305 is not shown, but it is understood that it is present on the vehicle 300.

In the arrangement of FIG. 4, the engine starting module 311 includes a super capacitor 440. The super capacitor 440 resides within the housing 315, and is electrically in parallel with the vehicle battery 302.

The super capacitor 440 is preferably a series of individual super capacitors. In FIG. 4, six super capacitors 442*a*, . . . 442*f* are provided in series. A diode 444, such as a Zener diode, is placed across each super capacitor 442*a*, . . . 442*f*, forming an active voltage clamp type balance circuit. Preferably, each super capacitor 442*a*, . . . 442*f* provides 2.4 volts DC charge.

The super capacitors 442*a*, . . . 442*f* are configured to store charge received from the electrical system of the vehicle 300. Preferably, the plurality of super capacitors 442*a*, . . . 442*f* defines six super capacitors, with each super capacitor having a value of 6,000 Farads. Of course, it is understood that more than six super capacitors may be used.

The engine starting module 311 also comprises a direct current (DC) converter 450. The DC converter 450 resides within the housing 315. The DC converter 450 is in electrical communication with the battery 302 of the vehicle, and is configured to transform voltage from the vehicle's electrical system 400 in order to charge the plurality of super capacitors 442*a*, . . . 442*f*.

The DC converter 450 may include a switch that splits the super capacitors 442*a*, . . . 442*f* into two or more equal or unequal stacks, and buck charges the stacks in parallel. The DC converter 450 may transfer more power to the super capacitors 442*a*, . . . 442*f* if the alternator 305 is running, and less power if the battery 302 does not have enough energy to start the vehicle or is otherwise in a state of low voltage.

The DC converter 450 can be broken up into multiple phase angles, enabling lower peak currents, less electromagnetic interference (EMI), and/or smaller more efficient components. The multiple phases may be equally spaced on a 360° basis. For example, a 4-phase DC converter 450 splits the current into four equal parts that are 90 degrees apart in the time spectrum. The DC converter 450 can control the current and/or voltage on the input side and the current and/or voltage on the output side. Current output control may allow the DC converter 450 to charge a completely empty bank of super capacitors 424 without excessive current (e.g., current that would normally collapse the converter 450).

The engine starting module 311 also includes control logic 420. The control logic 420 controls the release of energy from the super capacitors 442*a*, . . . 442*f*, and the re-charging of the super capacitors 442*a*, . . . 442*f* once the vehicle engine 309 is started and the alternator 305 is spinning. In one aspect, the control logic 420 includes a pulse width modulation controller based on the battery 302 voltage. The control logic 420 may comprise at least one transistor in electrical communication with the plurality of super capacitors 440 to control current flow into and/or out of the plurality of super capacitors 440.

The engine starting module 311 also comprises an isolation switch 430. The isolation switch 430 resides between the control logic 420 and the plurality of super capacitors 442*a*, . . . 442*f*. In one embodiment, the isolation switch 430 separates a ground of the battery 302 from a ground of the super capacitors 442*a*, . . . 442*f*.

The isolation switch 430 is configured to move between open and close positions. Movement between these positions is in response to signals from the control logic 420. In its default state, the isolation switch 430 is open and separates the charge of the super capacitors 442*a*, . . . 442*f* from the vehicle battery 302. This is the position shown in FIG. 4. When closed, the isolation switch 430 enables the super capacitors 442*a*, . . . 442*f* to send current to the battery 302.

In operation, when a condition of non-start is detected in the vehicle, that is, the battery 302 does not have enough voltage to provide charge to the starter 301 of the vehicle 300 or, perhaps, is below a recharge voltage threshold, the control logic 420 closes the isolation switch 430 and releases energy stored in the super capacitors 442*a*, . . . 442*f* into the vehicle battery 302. The control logic 420 modulates the discharge of the super capacitors 442*a*, . . . 442*f* so as to raise the voltage level of the battery 302. This may be done by controlling current flow through at least one transistor in electrical communication with the super capacitors 442*a*, . . . 442*f*.

The transfer of energy from the super capacitor bank 440 may be done for a designated time, which is a period of time sufficient to allow electronics in the vehicle 300 to reset and to allow the vehicle battery 302 to start the vehicle 300. In one aspect, this is a two-step process, where the electronics are first reset, followed by a re-charging of the battery 302. The designated time may be, for example, between 10 and 20 seconds.

In one embodiment, the engine starting module 311 includes at least one voltage comparator. The voltage comparator is part of the control logic 420, and is configured to detect a voltage of the electrical system of the vehicle 300. The electrical system includes the battery 302, the alternator 305 and the DC bus of the vehicle 300. This voltage will be balanced when the engine 309 is running. If the voltage of the vehicle battery 302 is below a predetermined recharge voltage threshold as detected by the voltage comparator, the control logic 420 will send a signal that closes the isolation switch 430 to re-charge the vehicle battery 302 at least to an operating voltage threshold and to start the alternator 305.

The control logic 420 may send an open signal to open the isolation switch 430. This may be done after a designated time or after the vehicle battery 302 has been recharged to the recharge voltage threshold. Alternatively, and more preferably, the plurality of super capacitors 442*a*, . . . 442*f* are re-charged by the vehicle's electrical system after the designated time. In this instance, the isolation switch 430 is maintained in a closed position. In one aspect, the control logic 420 causes the super capacitors 442*a*, . . . 442*f* to be constantly charged by the alternator 305 and/or the vehicle battery 302 at 14.5 volts for as long as the battery voltage is at least 9 volts. The isolation switch 430 may then be closed when the engine 309 is shut off.

In one embodiment, during the designated time, the control logic 420 is configured to modulate discharge of the plurality of ultra-capacitors 442*a*, . . . 442*f* based on a comparison of the voltage level of the battery 302 to a predetermined voltage threshold so as to raise the voltage level to at least the predetermined voltage threshold. If the predetermined voltage threshold is reached during the designated time, the control logic 420 opens the isolation switch 430 by sending an open signal. The predetermined voltage threshold may be, for example, 9 volts.

In a preferred embodiment, the control logic 420 causes the super capacitors 442*a*, . . . 442*f* to be constantly charged by the alternator 305 and/or the vehicle battery 302 for as long as the battery voltage is at or above the predetermined voltage threshold. Using a series totaling 1,000 Farads (6,000÷6), the super capacitors 442*a*, . . . 442*f* are charged to 14.5 volts. They will remain constantly charged when the system voltage is above the predetermined voltage threshold. Charging is done using an isolated DC converter at a constant wattage technique so as not to over drain the battery 302.

In one aspect of the inventions herein, the vehicle includes an operator interface. This is shown at 410 of FIG. 4. The operator interface 410 is operated by a vehicle operator. The operator interface 410 may include an indicator light (not shown), indicating the status of the super capacitors 442*a*, . . . 442*f*, e.g., UC power level. The control panel 410 may also include an energy start button 412. The operator interface 410 may also include a control panel 414 with an LED or other light indicator. The control logic 420 is in electrical communication with the operator interface 410 within the vehicle (such as vehicle 100C).

The energy start button 412 is configured to be pressed by the operator in response to the operator detecting that the battery 302 is weak. In this instance, the operator's activation of the system by pressing the energy start button 412 sends a signal to the control logic 420 to close the isolation switch 430. The isolation switch 430 is closed for the designated time in response to receiving the re-charge signal. This may be referred to as a manual mode.

During the manual mode, a comparator performs a comparison of the voltage level of the vehicle battery 302 to a predetermined voltage threshold. The control logic 420 modulates discharges of the super capacitors 440 based on the comparison so as to raise the voltage level to at least the recharge voltage threshold. Preferably, the voltage level is raised to an operating threshold which is greater than the predetermined recharge voltage threshold.

In one aspect, when the user detects an obvious non-start due to a dead electrical system, the user presses the engine start button 412 on the control panel 410. An indication light will flash for five seconds. During this time, a minimal amount of energy is 'pulsed' from the super capacitors 442*a*, . . . 442*f* over to the vehicle bus. This enables the vehicle's electronics to be completely reset and running prior to transferring the full amount of energy. This is particularly beneficial for newer vehicles.

During the five seconds, the operator will visually see the instrument cluster on the control panel 410 come alive. The engine starting module 311 may transfer approximately 250 watts/second during the five seconds, enabling the reset. This is approximately 1,250 Joules, leaving a remainder of over 100,00 Joules for the start. After five seconds, the light 414 will turn solid and the remaining energy from the super capacitors 442*a*, . . . 442*f* is transferred. The super capacitors 442*a*, . . . 442*f* will remain in parallel with the battery 302, enabling maximum power transfer.

Components of the engine starting module 311 may be solid state. As understood in the art of electronics, solid-state components, including field-effect transistors (FETs) and insulated gate bipolar transistors (IGBT), tend to be faster, more dependable, and consume less power than relays and contactors. In the arrangement of FIG. 4, a Field-Effect Transistor 435 is shown between the capacitor 440 and the isolation switch 430. The module 311 may include one or more enhancement mode n-channel field-effect transistors (N-FETS), which can be used in parallel to reduce the Equivalent Series Resistance (ESR) of the delivery of the energy from the capacitor bank 440 or even in a split mode recharging scheme. In some embodiments, the total quiescent current of the electronics may be less than 50 mA so that excess drain does not occur over extended periods of time.

The housing 315 of the engine starting module 311 goes in parallel to the vehicle's battery 302. The housing 315 and its capacitor bank 440 can come in different capacitance sizes depending on the amount of energy that would be needed for a typical start for the subject vehicle. In one aspect, the engine starting module 311 is available in both 12 volt DC and 24 volt DC sizes, depending on the size of the vehicle 300. In one aspect, the engine starting module 311 is offered as an after-market product that may be installed onto a vehicle in the engine compartment 140.

During operation, the engine starting module 311 sits quietly and fully charged in the vehicle 300. When conditions of a non-start (or at least battery weakness) are detected, either by the operator or automatically by the control logic and its voltage comparator, energy is released into the vehicle's battery 302 for up to the designated time, typically 10 to 20 seconds. This allows sufficient time for the electronics, e.g., vehicle loads 304*a*, in the vehicle to reset. A start is then possible.

There are multiple advantages to the engine starting module 311 described herein. For example, the module 311 offers a wide operating temperature range, such as −30 to +65° C. The module 311 is compatible with computerized vehicle systems as it pre-charges the electronics, enabling the electronics (including vehicle loads 304A) to be reset appropriately prior to a full transfer of power from the respective super capacitors 442.

The engine starting module 311 eliminates the worry of starting the truck or other large equipment. Indeed, the module 311 enables starting the vehicle or industrial equipment even where the battery 302 is completely dead. In one aspect, enough power is in the ultra-capacitor bank 440 to enable two attempts at starting, for a total of over 105,000 Joules and within an interval of only 15 minutes.

The engine starting module 311 is capable of transferring energy into the vehicle electrical system at an efficiency of greater than 99%. The engine starting module 311 is fully integrated and sealed. The module 311 is self-balancing for long life and is light in weight.

The module 311 can be packaged to have only two terminal connections to the outside world and can be connected to the engine 309 just like a battery 302 is connected to the engine 309. The control logic 420 can be co-located on a single printed circuit board assembly (PCBA) within the housing 315 for simplicity and lower cost.

Figure 5A:
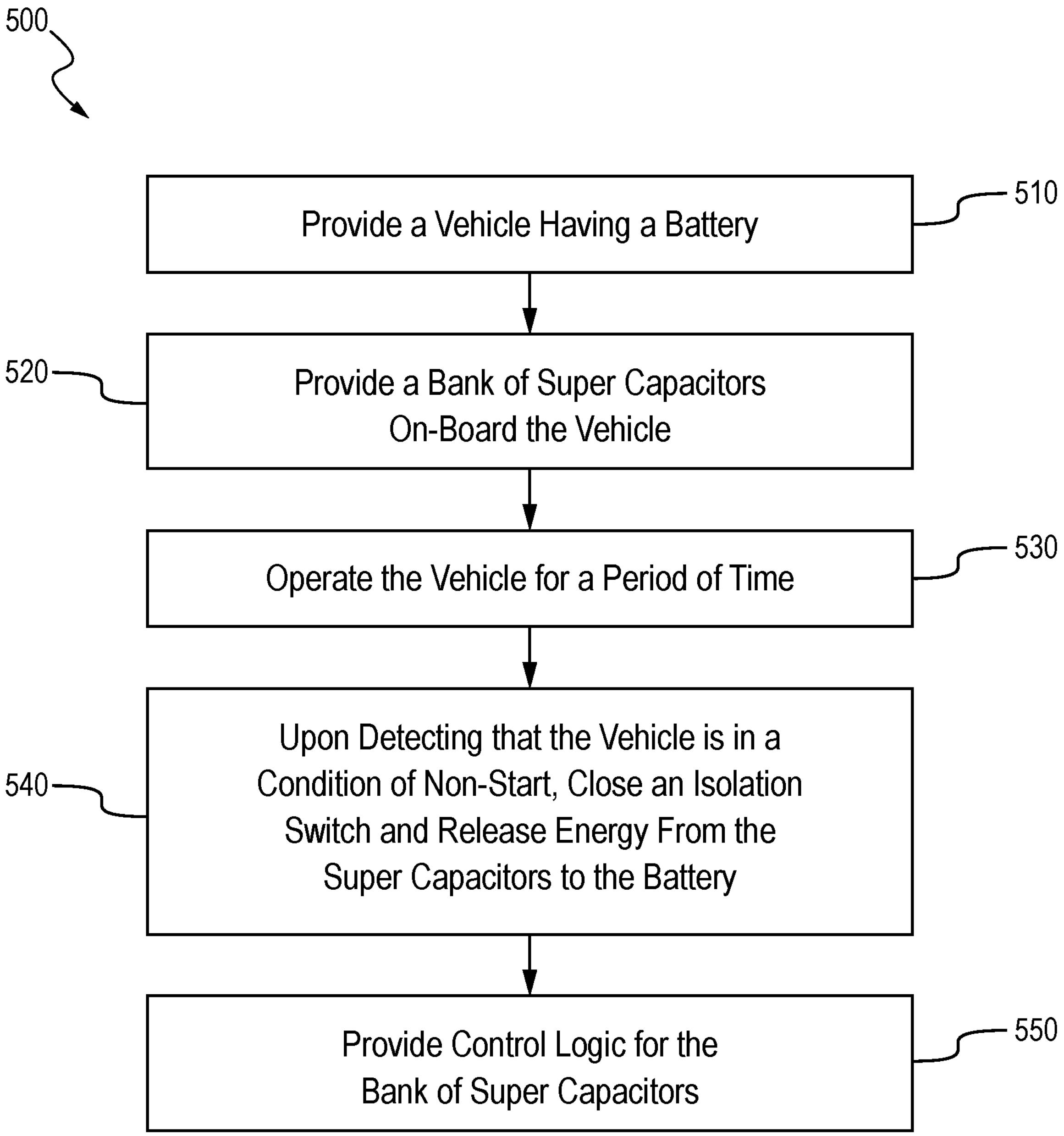
FIGS. 5A and 5B present a single flow chart showing steps for starting an engine for a vehicle, in one embodiment. This is done by using an engine starting module of the present invention.
Figure 5B:
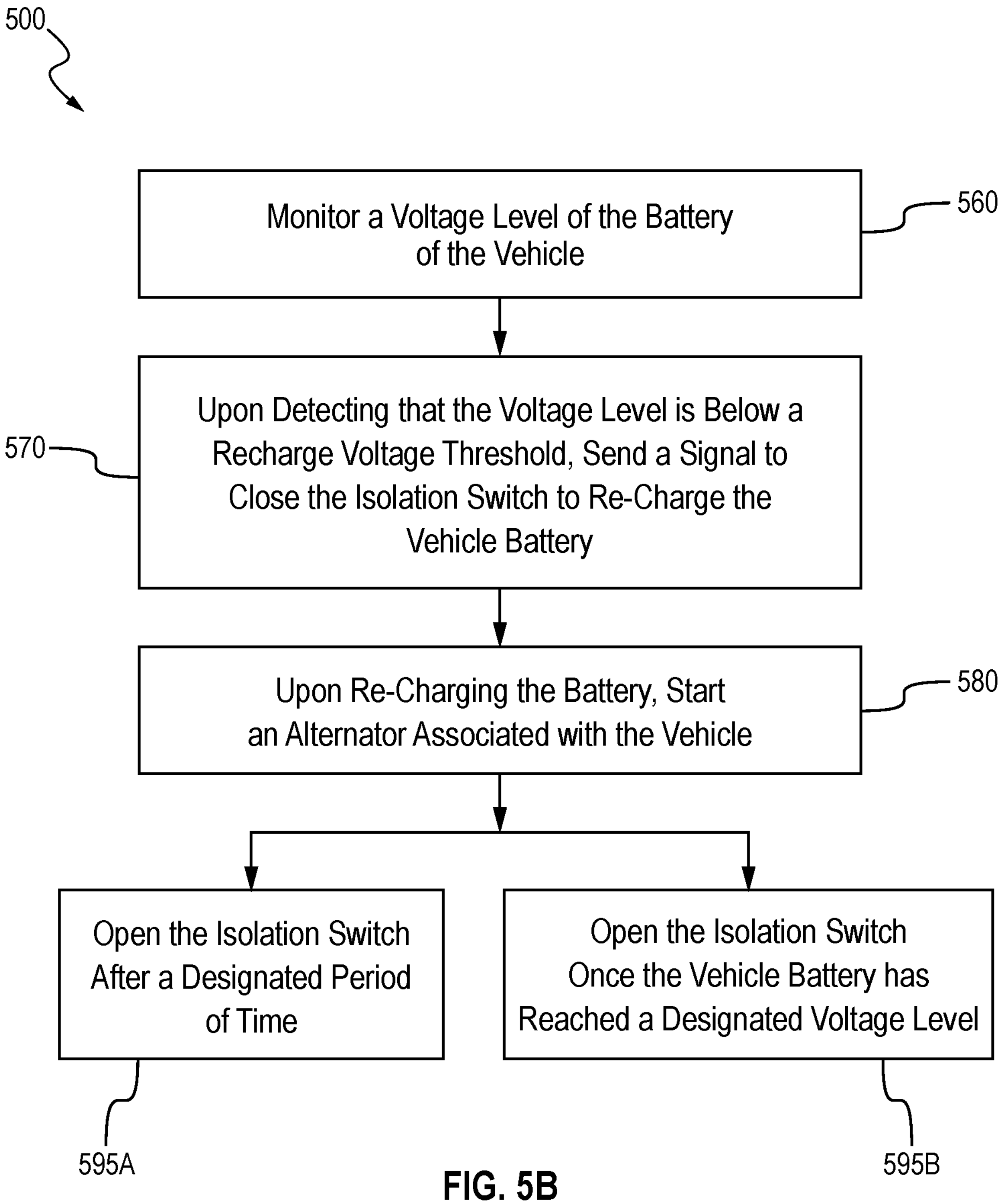

In view of the engine starting module 311 described above, a method of providing electrical energy to a vehicle is also provided herein. Providing electrical energy means providing power to reset electronics and/or to start an engine. FIGS. 5A and 5B present a single flow chart showing steps for a method 500 for starting an engine, in one embodiment.

The method 500 first includes providing a vehicle battery. This is shown at Box 510. The vehicle may be any land or ocean-going vessel that operates off of one or more internal combustion engines. Examples include any of the trucks presented in FIGS. 1A through 1E and the yacht presented in FIG. 2.

The battery is preferably a traditional lead acid battery. The step of Box 510 may include providing two or more batteries in series that provide charge for vehicle electronics and the engine.

The method 500 next includes providing a bank of super capacitors. This is seen in Box 520. The bank of super capacitors may be in accordance with the capacitor bank 440 shown in FIG. 4. The capacitor bank 440 comprises a bank of individual super capacitors 442 that reside on-board the vehicle and within the housing 315.

The method 500 also comprises operating the vehicle for a period of time. This is shown in Box 530. It is understood that operating the vehicle need not be continuous operation, but may be intermittent meaning that multiple vehicle stops occur, or even that the vehicle sits idle for a period of time between starts (or attempts at starting).

The method 500 then includes detecting that the vehicle is in a condition of non-start or that the battery is otherwise significantly weakened. Stated another way, a voltage of the vehicle battery has dropped below an operating threshold. This is indicated at Box 540. When this condition is detected, an isolation switch associated with the bank of super capacitors closes. The isolation switch is shown at 430 in FIG. 4.

As part of the step of Box 540, an operator may press a start button associated with a user interface. This sends a signal that causes the isolation switch to close. When the isolation switch closes, energy is released from the bank of super capacitors to the vehicle battery. This has the effect of recharging the battery. Stated another way, the voltage level of the vehicle battery is increased.

The method 500 may additionally comprise providing control logic for the bank of super capacitors. This is provided at Box 550. The control logic resides in a control circuit and controls a flow of current between the bank of super capacitors and the vehicle battery. In one embodiment, the control logic comprises a circuit that modulates a flow of current. In one embodiment, the control logic comprises a comparator, which may be firmware or software.

The method 500 also includes monitoring a voltage level of the battery of the vehicle. This is shown at Box 560 of FIG. 5B.

Upon detecting that the voltage level of the vehicle battery is below a recharge voltage threshold, the method 500 includes sending a signal to close the isolation switch. This is an automatic step seen at Box 570. This allows to the bank of super capacitors to re-charge the vehicle battery. Note that the step of Box 570 may operate in the same way as the step of Box 540.

In one aspect, once the battery is re-charged, an alternator associated with the vehicle is started. This is done by operation of the engine associated with the vehicle. This step is provided at Box 580.

In one embodiment of the method 500, the isolation switch remains closed for a designated period of time. The designated period of time is a pre-set time believed to re-charge the vehicle battery. This is provided by programming a timer, which in turn may be a part of the control circuit. The designated period of time may be, for example, between ten seconds and twenty seconds, or even up to one minute, depending on the size of the battery and the number of super capacitors employed in the bank of super capacitors. Thereafter, the isolation switch is re-opened. This is shown at Box 595A.

In another embodiment of the method 500, the isolation switch remains closed until the vehicle battery has reached a designated voltage level, referred to as an operating threshold. This is seen at Box 590B.

In the step of Box 590B, the control logic is configured to modulate discharge of the plurality of super capacitors based on a comparison of the voltage level of the vehicle battery to the operating threshold so as to raise the voltage level. Optionally, a timer may be used to re-open the isolation switch after a designated period of time if the operating threshold is not reached. Otherwise, control logic opens the switch when the re-charge threshold voltage level is reached.

Optionally, the isolation switch remains closed while the vehicle is operated. In this way, the super capacitors are constantly charged by the alternator and/or the vehicle battery for as long as the battery voltage is above the operating threshold, such as 9 volts. In one aspect, the re-charge time for the bank of super capacitors 440 is about 15 minutes. Of interest, the control logic draws its power from the bank of super capacitors 440.

In another aspect, the isolation switch will close once the super capacitors 440 have been re-charged. Current flows from the battery and the alternator through the isolated DC Converter 450. A constant wattage technique is preferred so as not to over drain the battery 302.

As can be seen, a novel engine starting module is provided. It will be appreciated that the inventions are susceptible to modification, variation and change without departing from the spirit thereof. For example, the engine starting module 311 has been described herein in the context of starting a combustion engine for a land-based cars or trucks. However, the invention has equal application to starting combustion engines associated with Gen-Sets, boats, RV's, ATV's, motorcycles and jet skis.

What is claimed is:

1. An engine starting module for a vehicle, comprising:

a housing configured to reside on-board the vehicle;

a plurality of super capacitors connected in series within the housing, the super capacitors being configured to store charge;

an isolation switch movable between open and close positions such that when the isolation switch is in its open position, the isolation switch separates the charge of the super capacitors from a vehicle battery, but when in the close position, the isolation switch enables the super capacitors to send current to the vehicle battery;

control logic, wherein the control logic controls energy transferred from the super capacitors to the vehicle battery during operation of the engine starting module and moves the isolation switch between its open and close positions; and a direct current (DC) converter also within the housing, wherein the DC converter is configured to be placed in electrical communication with the vehicle battery, and the DC converter is configured to transform voltage from the vehicle battery and re-charge the plurality of super capacitors when a voltage level of the battery is above an operating voltage threshold, and while the isolation switch is in its close position;

and wherein:

when a condition of non-start is detected in the vehicle, the control logic is configured to close the isolation switch and release energy stored in the super capacitors into the vehicle battery;

energy is released to the vehicle battery for a designated time; and the designated time is a period of time sufficient to allow electronics in the vehicle to reset and to allow the battery to reach a recharge voltage threshold to start the vehicle.

2. The engine starting module of claim 1, wherein:

the plurality of super capacitors comprises 6 to 12 super capacitors; and the housing resides in an engine compartment of the vehicle.

3. The engine starting module of claim 2, wherein:

each of the plurality of super capacitors has a value of 6,000 Farads; and each of the plurality of super capacitors has an output of 2.4 volts DC.

4. The engine starting module of claim 2, wherein:
the plurality of super capacitors reside in parallel with the vehicle battery; and
the isolation switch resides between the control logic and the plurality of super capacitors.

5. The engine starting module of claim 4, wherein:
the isolation switch separates a ground of the battery from a ground of the housing holding the super capacitors.

6. The engine starting module of claim 1, wherein the designated time is at least 10 seconds.

7. The engine starting module of claim 1, wherein energy is released from the super capacitors in a first stage that resets electronics in the vehicle, and a second stage after the first stage that re-charges the vehicle battery up to at least the operating voltage threshold.

8. The engine starting module of claim 1, further comprising:
at least one voltage comparator configured to detect a voltage of the vehicle battery and, if the voltage of the vehicle battery is below a recharge voltage threshold, send a signal that closes the isolation switch to re-charge the vehicle battery and start an alternator associated with the vehicle.

9. The engine starting module of claim 8, wherein:
the control logic maintains the isolation switch in its close position until the vehicle battery reaches the operating voltage threshold; and
further maintain the isolation switch in its close position while the engine is running to re-charge the super capacitors.

10. The engine starting module of claim 9, wherein the control logic causes the super capacitors to be constantly charged by the alternator and/or the vehicle battery at 14.5 volts for as long as the battery voltage is at or above the operating voltage threshold.

11. The engine starting module of claim 10, wherein the operating voltage threshold is at least 9 volts.

12. The engine starting module of claim 1, wherein during the designated time, the control logic is configured to modulate discharge of the plurality of super capacitors based on a comparison of the voltage level of the vehicle battery to a predetermined voltage threshold so as to raise the voltage level to at least the operating voltage threshold.

13. The engine starting module of claim 12, wherein if the operating voltage threshold is reached during the designated time, the control logic is configured to re-open the isolation switch.

14. The engine starting module of claim 5, wherein:
the control logic is in electrical communication with an energy start button within the vehicle;
the energy start button is configured to be pressed by an operator of the vehicle in response to the operator detecting weakness in the battery, with the weakness being indicative of a condition of lost voltage in the vehicle battery, causing a re-charge signal to be sent to the control logic; and
the control logic is configured to close the isolation switch in response to receiving the re-charge signal.

15. The engine starting module of claim 5, wherein the vehicle is a city delivery truck, or an over-the-road truck pulling at least one trailer.

16. The engine starting module of claim 2, wherein a Zener diode clamp is placed across each super capacitor, forming an active voltage balance circuit.

17. A method of starting an engine, comprising:
providing a vehicle having a battery and a combustion engine;
providing a bank of super capacitors on-board the vehicle, with the bank of super capacitors being in selective electrical communication with the battery by means of an isolation switch;
operating the vehicle for a period of time;
providing control logic for the bank of super capacitors, wherein the control logic resides in a control circuit and controls a flow of current between the bank of super capacitors and the vehicle battery;
using the control logic, monitoring a voltage of the battery;
upon detecting that the vehicle is in a condition of non-start, closing the isolation switch to release energy from the super capacitors to the battery; and
starting the engine;
wherein:
the control logic, the isolation switch and the bank of super capacitors all reside within a housing, with the housing residing on-board the vehicle; and
the isolation switch remains closed for a designated period of time, with the designated period of time being a time that allows electronics in the vehicle to reset and that allows the battery to be re-charged to a voltage level that is above an operating voltage threshold so that the vehicle may be started.

18. The method of claim 17, wherein the isolation switch further remains closed while the engine is running and the vehicle battery is above the operating threshold, allowing the vehicle battery to re-charge the bank of super capacitors.

19. The method of claim 17, wherein:
the super capacitors reside within an engine compartment of the vehicle;
the super capacitors of the bank of super capacitors are connected in series within the housing;
the super capacitors of the bank of super capacitors reside in parallel with the vehicle battery;
a direct current (DC) converter also resides within the housing, wherein the DC converter is configured to be placed in electrical communication with the vehicle battery to transform voltage from the battery and re-charge the super capacitors of the bank of super capacitors when the isolation switch is in its close position;
the vehicle comprises an alternator.

20. The method of claim 19, wherein the control logic causes the super capacitors to be constantly charged by the alternator and/or the vehicle battery at 14.5 volts for as long as the battery voltage is at or above the operating threshold.

21. The method of claim 19, wherein the operating threshold is at least 9 volts.

22. The method of claim 17, wherein the vehicle is a city delivery truck.

23. The method of claim 17, wherein energy is released from the super capacitors in a first stage that resets the electronics in the vehicle, and a second stage after the first stage that re-charges the vehicle battery.

24. The method of claim 23, wherein:
the control logic is in electrical communication with an energy start button within the vehicle;
and the method further comprises pressing the energy start button in response to detecting weakness in the battery, causing a re-charge signal to be sent to the control logic to close the isolation switch.

25. The method of claim 23, wherein detecting that the vehicle is in a condition of non-start comprises the control logic detecting that a voltage level of the battery is below a predetermined recharge voltage threshold which is less than the operating threshold.

* * * * *